4
United States Patent Office 2,823,183
Patented Feb. 11, 1958

2,823,183

AIR FILTER OIL

Thorkild F. Lonstrup, Sarnia, Ontario, Canada, assignor to Esso Research and Engineering Company, a corporation of Delaware No Drawing. Application July 22, 1955
Serial No. 523,860

2 Claims. (Cl. 252—57)

This invention relates to air filter oils that have improved ability to entrap dust particles. Particularly, the invention relates to air filter oils which comprise a blend of a hydrocarbon oil with a polymerized ethylene, the blend containing combined therein a minor, but improving amount of a polyoxyethylene derivative of an ester of a polyhydric material.

This application is a continuation-in-part of copending application Serial No. 451,981, filed August 24, 1954, now abandoned.

The type of air filter mostly used today in air conditioning units consists of a system of folded wire screens which are held in place by a metal frame to form a box. Since the object of the air filter is to remove as much dust and other foreign particles as is possible from air passing through the filter, the screen system is ordinarily wetted by oil. The application of oil to the filter is made either by dipping the filter system in the oil, followed by a draining period during which excess oil is drained from the filter, or by inserting the filter system into a centrifuge mechanism and spraying the oil on the filter screen. After the oil spray the filters are freed from excess oil by centrifugal force.

It has been found that ordinary engine oil is unsatisfactory for use in coating air filters since the amount of the oil adhering to the metal screens is insufficient to effectively retain dust particles. In addition, air filters are subjected to temperatures in excess of about 120° F. during the summer months and at these temperatures ordinary engine oil has been found to drip off, leaving a dry metal screen which is incapable of trapping the dust particles. Since the amount of wear of a diesel engine depends to a considerable degree upon the amount of silicious dust which is allowed to enter the combustion chamber of the engine, the problem of furnishing dust free air for railway diesel equipment is of considerable importance.

It has now been found and forms the object of this invention that an improved air filter oil may be prepared by blending with a mineral oil, a minor amount of a polymerized ethylene resin and a minor amount of a polyoxyethylene substitute mono-ester of a polyhydric material.

The base oil for the improved air filter oil of this invention is preferably a mineral oil of a viscosity at 210° F. within the range of from about 50 to about 80 SUS, preferably about 50 to 60 SUS. Although any mineral oil within this range is operable, it is especially preferred to use a light naphthenic oil having a viscosity of about 60 SUS at 210° F. such as derived from a mild phenol treatment of a Tia Juana crude source.

The polymerized ethylene which is incorporated with the mineral oil to prepare the improved air filter oils of this invention preferably is of a molecular weight within a range from about 5,000 to about 35,000 Staudinger. The molecular weight is determined from measurements of osmotic pressure of polyethylene solutions in xylene at 85° C. Especially preferred are those polyethylene resins which have molecular weights within a range from about 11,000 to about 30,000 Staudinger.

Techniques for the polymerization of ethylene into various resinous compounds are old in the art. For example, U. S. Patent No. 2,153,553, issued on April 11, 1939, to Fawcett, Gibson and Perrin, describes in detail various techniques for preparing polyethylene materials. Generally, the formation of these resins is accomplished by subjecting ethylene to temperatures of from about 200° to 600° C. and to pressures in the order of 200 atmospheres or above.

The third component of the improved air filter oils of this invention are broadly described as polyoxyethylene substituted partial esters of polyhydric materials. These materials are typified by the partial esters of dehydrated polyhydric alcohols such as the hexitols. Partial dehydration converts the polyhydric alcohol to an epoxide, or inner ether type of compound hydroxyl substituents and either one or two mono-oxy 4–7 membered carbon-oxygen rings in its chemical configuration. The hydroxyl groups attached to the inner ethers still retain the typical reaction with a fatty acid to form an ester. The esterification of one or more hydroxyl groups in the partially dehydrated polyhydric alcohol yields esters which may be used to form the polyoxyethylene substituted materials which are useful in the present invention.

The acids which may be used to esterify the cyclic-ether compounds are those fatty acids having 8 to 30 carbon atoms per molecule such as those present in naturally occurring animal and vegetable oils and fats and which are derived therefrom by saponification. These fatty acids are exemplified by such materials as caproic, caprylic, capric, lauric, myristic, palmitic, oleic, linoleic, ricinoleic, stearic, mono-hydroxy stearic, poly-hydroxy stearic, erucic, behenic, etc. Also those fatty acids which are synthetically prepared by oxidation of hydrocarbons or hydrogenation of naturally occurring fatty acids may also be used. It is also contemplated that mixtures of these acids may be used to form esters of partially dehydrated polyhydric alcohols.

These esters are preferably made by reacting one mol of a polyhydric alcohol or one mol of a partially dehydrated alcohol with from one to three mols of the fatty acid. A catalyst may be used such as sulfuric acid, phosphoric acid, sodium hydroxide and the like. The reactants are mixed together and heated to a temperature of about 150° to 300° C. until the reaction is completed. It may be desirable to maintain an atmosphere of an inert gas such as nitrogen or carbon dioxide during the reaction.

Examples of the esters which may be employed to form the additives of the present invention include sorbitan monooleate, mannitol monooleate, hexitan monooleate, sorbitan monolinoleate, glucose monooleate, fructose monoerucate, pentaerythritol monooleate, pentaerythritol monoerucate, pentaerythritol monolinoleate and homologous compounds. Sorbitan monooleate and monolaurate are preferred, and the sorbitan monooleate is especially preferred.

The polyoxyethylene derivatives of these esters are prepared by etherification with ethylene oxide of the remaining groups. The polyoxyethylene substituted monoesters of sorbitan are preferred and have a viscosity of about 150 to 600, preferably 350 to 550, centipoises at 25° C.; a specific gravity of about 1.00 to 1.15, preferably 1.00 to 1.10; a flash point of about 400° to 650° F., preferably about 550° to 605° F.; and a fire point of about 480° to 675° F., preferably about 600° to 645° F. Especially preferred is the polyoxyethylene substituted sorbitan monooleate which is commercially available under the name Tween 81 and which has the following characteristics:

| | |
|---|---|
| Average molecular weight | 471 |
| Viscosity (cp. @ 25° C.) | 350–550 |
| Specific gravity | 1.00–1.05 |
| Flash point (° F.) | 550 |
| Fire point (° F.) | 600 |

The air filter oil of this invention is prepared by blending from about 95% to about 99% of the hydrocarbon oil, with from about 1.0% to about 5.0%, preferably about 1.5 to 2.5%, by weight of a polymerized ethylene and combining with said blend from about 0.02% to about 0.3%, preferably about 0.05 to 0.2%, by volume, based on the volume of the blend, of the polyoxyethylene substituted mono-ester. It is to be understood, of course, that minor variations of these proportions may be used without departing from the spirit of the instant invention.

The improved air filter oils are prepared by simply admixing the desired amount of the polyethylene in the oil and heating to a temperature above the melting point of the polyethylene. Ordinarily this is accomplished by heating to about 250° to 280° F., depending upon the molecular weight of the polyethylene. Prior to cooling, the polyoxyethylene substituted mono-ester is added to a blend.

Various blends of the improved air filter oil, prepared in accordance with this invention have been prepared in accordance with the procedure described above. The viscosities of some of these blends at various temperatures are set out in Table I below:

Table I

| Mineral Oil (75 SUS/ 210° F.)*+2 wt. percent Polyethylene (14,000 M. W.) +0.2 vol. percent Tween 81 | | Mineral Oil (75 SUS/ 210° F.)*+2.5 wt. percent Polyethylene (14,000 M. W.) +0.1 vol. percent Tween 81 | | Mineral Oil (75 SUS/ 210° F.)*+2.5 wt. percent Polyethylene (14,000 M. W.) +0.2 vol. percent Tween 81 | |
|---|---|---|---|---|---|
| Temp., °F. | Vis., SUS | Temp., °F. | Vis., SUS | Temp., °F. | Vis., SUS |
| 170 | 277 | 170 | 355 | 170 | 356 |
| 210 | 139 | 210 | 158 | 210 | 164 |
| 250 | 81 | 250 | 90 | 250 | 94 |

*A mild phenol extracted Tia Juana distillate.

As was stated above, in addition to the proper viscosities, air filter oils must have properties which enable them to be retained by the metal screens, and they must be high in a characteristic known to the art as "wicking characteristics." Wicking refers to the ability of the oil to wet through accumulated dust particles and thus prevent the surface of the air filter from becoming so dry that dust is not trapped. The wicking properties of the air filter oils are generally determined by the rising of the oil in a 4 mm. I. D. glass tube stoppered in the bottom with a cotton plug and filled with fine clay. The tube is then immersed vertically to a height of ¾″ in the oil. The better the wicking characteristics of the oil, the higher it climbs in the tube.

Test data on the wicking characteristics of various blends are set out in Table II below:

Table II

| Air Filter Oil | mm. Wicking in Clay-filled 4 mm. Tube | | | |
|---|---|---|---|---|
| | 1 Hr. | 2 Hrs. | 3 Hrs. | 72 Hrs. |
| (A) Mineral Oil (75 SUS/210° F.) +2.5 wt. percent Polyethylene (14,000 M. W.) | 4 | 8 | 8 | 55 |
| (B) Mineral Oil (75 SUS/210° F.) +2.5 wt. percent Polyethylene (14,000 M. W.) +0.05 vol. percent Tween 81 | 3 | 4 | 5 | 29 |
| (C) Mineral Oil (75 SUS/210° F.) +2.5 wt. percent Polyethylene (14,000 M. W.) +0.05 vol. percent Span 20 [1] | 3 | 4 | 5 | 41 |
| (D) Mineral Oil (60 SUS/210° F.) +2.5 wt. percent Polyethylene (28,000 M. W.) | 3 | 6 | 10 | 87 |
| (E) Mineral Oil (60 SUS/210° F.) +2.5 wt. percent Polyethylene (28,000 M. W.) +0.05 vol. percent Span 80 [2] | 3 | 8 | 11 | 76 |
| (F) Mineral Oil (60 SUS/210° F.) +2.5 wt. percent Polyethylene (28,000 M. W.) +0.05 vol. percent Tween 81 | 7 | 12 | 14 | 94 |
| (G) Mineral Oil (60 SUS/210° F.) +2.5 wt. percent Polyethylene (28,000 M. W.) +0.05 vol. percent Tween 80 [3] | 5 | 8 | 10 | 70 |

[1] Span 20—Sorbitan monolaurate:
| | |
|---|---|
| Viscosity (cp. @ 25° C.) | 3,500–5,000 |
| Specific gravity | 1.00–1.06 |
| Flash point (° F.) | 400 |
| Fire point (° F.) | 440 |

[2] Span 80—Sorbitan monooleate:
| | |
|---|---|
| Viscosity (cp. @ 25° C.) | 900–1,150 |
| Specific gravity | 1.00–1.05 |
| Flash point (° F.) | 410 |
| Fire point (° F.) | 475 |

[3] Tween 80—polyoxyethylene Sorbitan monooleate:
| | |
|---|---|
| Average molecular wt. | 998 |
| Viscosity (cp. @ 25° C.) | 350–550 |
| Specific gravity | 1.06–1.10 |
| Flash point (° F.) | 605 |
| Fire point (° F.) | 645 |

Blend F represents a preferred embodiment of this invention, and the wicking characteristics of this blend are excellent. The good wicking properties of Blend F, especially during the first hour, is a probable explanation of why this blend performed so well as compared to the air filter oil blends without Tween 81. The above data also show that the Tween 81 additive was superior in this respect to other dispersants such as Span 80 and Tween 80. The data further indicate, however, that Tween 80 could also be effectively utilized, since it shows a definite wicking improvement during the first hour or so, which is probably the most critical time period under field conditions where dust is being continually deposited.

To test the retention characteristics of the oil blends of this invention, a weighed test piece of filter screen was dipped in the oil blends at 170° F., allowed to drip off at room temperature and then reweighed. The test piece was then stored in an oven at 170° F. for two hours, after which time the percentage of the original oil load retained was determined. The data on this test is given in Table III below:

Table III

| Oil | Grams of Oil Retained After Dipping at 170° F. | Percent Retained After Storage at 170° F. for 2 Hours |
|---|---|---|
| Mineral Oil (75 SUS/210° F.) +2.5% Polyethylene (14,000 M. W.) | 4.29 | 50 |
| Mineral Oil (75 SUS/210° F.) +2.5% Polyethylene (14,000 M. W.) + .05% Tween 81 | 4.98 | 50 |
| Mineral Oil (75 SUS/210° F.) +2.5% Polyethylene (14,000 M. W.) +.05% Span 20 | 5.73 | 58 |
| Mineral Oil (60 SUS/210° F.) +2.5% Polyethylene (28,000 M. W.) | 7.73 | 98 |
| Mineral Oil (60 SUS/210° F.) +2.5% Polyethylene (28,000 M. W.) +.05% Tween 81 | 10.91 | 98 |

Filter adhesion characteristics of blends prepared in accordance with this invention were tested under actual operating conditions. The oiling equipment used was a Paxton Mitchell centrifuge. The machine comprised one cleaning and one oiling centrifuge. The oiling centrifuge basket had a diameter of 54" and was 72" deep. This basket accommodated 4 standard 20" x 20" x 2" filters. The basket with 4 filters was spun at 1200 R. P. M. The oil was sprayed in two solid streams from the center toward the rotating filters. The temperature of the oil was controlled thermostatically, and the oiling and centrifuging cycles were automatically regulated in seconds. After an oiling time of 60 seconds, the following oil retention was obtained for a blend in accordance with the inventive concept.

Table IV

| | Oiling Temp., degree | Oil Retention |
|---|---|---|
| Mineral Oil (60 SUS/210° F.) +2.5% Polyethylene (28,000 M. W.) +0.05% Tween 81. | 160 | 11¼ oz. (average of 16 filters). |
| | 180 | 8 oz. (average of 8 filters). |
| | 200 | 6½ oz. (average of 8 filters). |

To show the superior dust accumulating ability of the material of this invention, actual field tests were run on diesel locomotive air filter screens coated with a blend of mineral oil and polyethylene, a blend in accordance with the inventive concept and a commercially available air filter oil. These air filter oil blends in the test were referred to as Oil A, Oil B and Oil C, respectively. Results on this field test are set out in Table V below. It will be noted from the table that the oil blend of the invention shows consistently higher dust accumulative ability than the other test oils.

Table V

| Sample No. | Filter Mileage | Dust Load on 11 Filters | | |
|---|---|---|---|---|
| | | Oil A* 9½ oz. per Filter | Oil B* 9 oz. per Filter | Oil C* 1 oz. per Filter |
| | | Oz. | Oz. | Oz. |
| 1 | 3,200 | | 52 | |
| 2 | 3,200 | 49 | | 46 |
| 3 | 3,200 | | 56 | 52 |
| 4 | 3,200 | | 46 | 40 |
| 5 | 3,200 | 51 | | 41 |
| 3 | 5,800 | | 124 | 93 |
| 4 | 5,800 | | 126 | 124 |
| 5 | 5,800 | 122 | | 88 |
| 3 | 8,000 | | 174 | 162 |
| 5 | 8,000 | 160 | | 130 |

*A=Mineral oil (60 SUS/210° F.) +2.5% polyethylene (28,000 M. W.).
*B=Mineral oil (60 SUS/210° F.) +2.5% polyethylene (28,000 M. W.) +0.05% Tween 81.
*C=Mineral oil (51 SUS/210° F.) +3% polymerized isobutylene +0.05% pour depressant.

To summarize briefly, the instant invention relates to an improved air filter oil which comprises a blend of from 95.0% to 99.0% by weight of a mineral lubricating oil having a viscosity at 210° F. within a range of from about 50 to 80 SUS, with from about 1.0% to about 5.0% by weight of a polymerized ethylene having a molecular weight of about 11,000 to about 30,000 Staudinger, said blend containing combined therein from about 0.02% to about 0.3% by volume, based on the volume of the total blend, of a polyoxyethylene substituted mono-ester of a polyhydric material. The preferred embodiment of the invention contemplates from about 1.5% to about 2.5% by weight of the polyethylene with a light naphthenic mineral oil distillate and about 0.05 to 0.2% by volume of the derivative of a mono-ester of a partially dehydrated polyhydric material.

What is claimed is:

1. An air filter oil comprising a blend of mineral oil having a viscosity at 210° F. between about 50 and 60 SUS, and containing from about 1.5 to about 2.5% by weight of polyethylene having a molecular weight within the range of from about 11,000 to about 35,000 Staudinger, and from about 0.05 to about 0.2% of polyoxyethylene sorbitan mono-oleate having a viscosity between about 350 to about 550 cp. at 25° C., a specific gravity of from about 1.0 to about 1.15, a flash point of from about 400 to about 650° F. and a fire point of from about 480 to about 675° F.

2. The air filter oil defined in claim 1 wherein said polyoxyethylene sorbitan mono-oleate has a specific gravity between 1.00 and 1.05, a flash point of about 550° F. and a fire point of 600° F.

References Cited in the file of this patent

UNITED STATES PATENTS

| 2,620,044 | Fine et al. | Dec. 2, 1952 |
| 2,627,938 | Frohmader et al. | Feb. 10, 1953 |